INVENTORS
CARLO P. DOMENICHINI
LEO TERJENIAN
BY Edgar O. Rost
ATTORNEY

Sept. 29, 1970  C. P. DOMENICHINI ET AL  3,531,613
CAPACITIVE FILTER FOR SUPPRESSION OF SPURIOUS
ELECTRICAL RADIATION
Filed Aug. 22, 1968  3 Sheets-Sheet 2

INVENTORS
CARLO P. DOMENICHINI
LEO TERJENIAN
BY
ATTORNEY

Sept. 29, 1970  C. P. DOMENICHINI ET AL  3,531,613
CAPACITIVE FILTER FOR SUPPRESSION OF SPURIOUS
ELECTRICAL RADIATION
Filed Aug. 22, 1968  3 Sheets-Sheet 3

INVENTORS
CARLO P. DOMENICHINI
LEO TERJENIAN
BY *Edgar O. Rost*
ATTORNEY

United States Patent Office 3,531,613
Patented Sept. 29, 1970

3,531,613
CAPACITIVE FILTER FOR SUPPRESSION OF SPURIOUS ELECTRICAL RADIATION
Carlo P. Domenichini, Lexington, and Leo Terjenian, Natick, Mass., assignors to Raytheon Company, Lexington, Mass., a corporation of Delaware
Filed Aug. 22, 1968, Ser. No. 754,641
Int. Cl. H05b 9/06, 5/00
U.S. Cl. 219—10.55                              7 Claims

ABSTRACT OF THE DISCLOSURE

A capacitive filter arrangement coupled to the voltage supply circuit of an electrical energy generator to reduce undesired radiation of energy to acceptable levels in accordance with Federal Communications Commission specifications and requirements for such generators when employed in certain electronic equipment. Elimination of corona discharge at predetermined levels of alternating current and no breakdown of insulation material at predetermined levels of direct current are other characteristics of the structure of the invention.

BACKGROUND OF THE INVENTION

The magnetron is an illustrative electrical device for the generation of energy in the electromagnetic spectrum. The text "Microwave Magnetrons," Radiation Laboratories Series, vol. 6, by G. B. Collins, McGraw-Hill Book Company, Inc., 1948, provides explicit details on construction and operation of such devices. The generated microwaves have many uses including radar systems for the location and detection of distant objects as well as cooking in electronic ovens. Conventionally, a power supply circuit includes a high voltage transformer carrying many thousands of volts of rectified electrical energy along leads to the cathode components of the microwave energy generator.

In view of the high electrical voltages present in the energy generation apparatus the inherent safety as well as interference problems with adjacent communications equipment such as television and U.H.F. as well as high frequency radio have dictated the imposition of controls and regulation by the Federal Communications Commission. Particularly, allocation of frequency bands of operation in the low and high frequency radio spectrum have been designated as well as peak and normal voltage handling destructive tests. For industrial microwave frequency electronic oven applications the first frequency band allocated is 915 megacycles and many U.H.F. communications links as well as TV systems may operate at or near such frequencies. The second and the perhaps most commonly employed band is 2450 megacycles. Police and government communications operate close to this frequency and elimination of interference is therefore of paramount importance. Second harmonic frequencies of the main microwave generator operating frequency or 4900 megacycles, plus or minus 100 megacycles, also create problems in interference with communications systems and equipment. The filtering and suppression of radiation at TV, U.H.F. and the lower portion of the microwave frequency spectrum as well as second harmonics of these frequencies from microwave energy generators is therefore required in order to comply with the aforementioned regulations.

A prior art capacitive filter box for microwave generators of the magnetron type is disclosed in U.S. Pat. 3,020,447, issued Feb. 6, 1962 to Louis H. Schall and Donald L. Winsor and assigned to the assignee of the present invention. This structure provides an electrically conductive shield enclosing the cathode electrode support assembly and an internal condenser plate is defined with dielectric spacers cooperating with opposite sidewalls of the shield. Ceramic insulating bushings are provided for feed-through of the high voltage electrical leads from the external supply circuit to the cathode assembly. A low inductance shunt lead between the condenser plate and the cathode lead is designed to suppress radiation due to undesired resonances in the oscillation circuit.

In operation the prior the prior art structure has failed to prevent radio frequency leakage along paths in many regions of the conductive enclosure. Additionally, the electrical insulating bushings of ceramic material for the high voltage connections do not prevent radio frequency leakage through this structure. While suppressing some of the radiated noise energy in the frequency spectrum the structure has not provided the reduction of interference with adjacent electronic equipment due to the areas of excessive radio frequency leakage through the filter box construction. The capacitance of the Schall et al. prior art embodiment is only of the order of approximately 100 micromicrofarads or, as it will be referred to herein, picofarads. The need arises therefore to provide a substantially higher value of capacitance to more fully isolate the microwave generator leads at the operating frequency as well as the second and higher harmonic frequencies in order to comply with the standards established by the F.C.C.

SUMMARY OF THE INVENTION

In accordance with the teachings of the present invention a unique capacitive filter enclosure means is provided having internal as well as external conductive plate members to prevent radiation of the operating and harmonic radio frequencies through all the leads and/or wires disposed at the back end of the microwave energyy generators. Through a novel structural feature of the outer conductive plate member the capacitive means provides a leakage path impedance approaching a short circuit adjacent to an aperture in the enclosure walls to thereby define a radio frequency choke. At TV and U.H.F. frequency bands the leakage path impedance is reduced substantially to limits well within the Federal Communications Commission regulations. Second and higher harmonic frequency radiation at high microwave frequencies which previously exceeded the regulation limits have also been substantially reduced by a factor of approximately 20 decibels. Plural dielectric plates sandwiched between the capacitive disc members and enclosure walls are dimensioned to enclose substantially all the previous radio frequency leakage areas and comply with the stringent requirements of no insulating material breakdown at voltages of many thousands of volts under normal or peak conditions. The dielectric members may be of any configuration such as round, square or elliptical. The structure also satisfied the requirement of being corona free at all peak and operating conditions. In an illustrative embodiment of the invention a measured capacitance of approximately 600 picofarads or 500 percent higher indicates the order of magnitude of the improvement of the present invention over the art of record.

The disclosed apparatus is equally applicable to all energy generators requiring high voltage supplies including magnetrons, crossed field devices, traveling wave tubes, klystrons and high powered triode tubes.

BRIEF DESCRIPTION OF THE DRAWINGS

In the accompanying drawings.

DESCRIPTION OF THE PREFERRED EMBODIMENT

Figure 1:
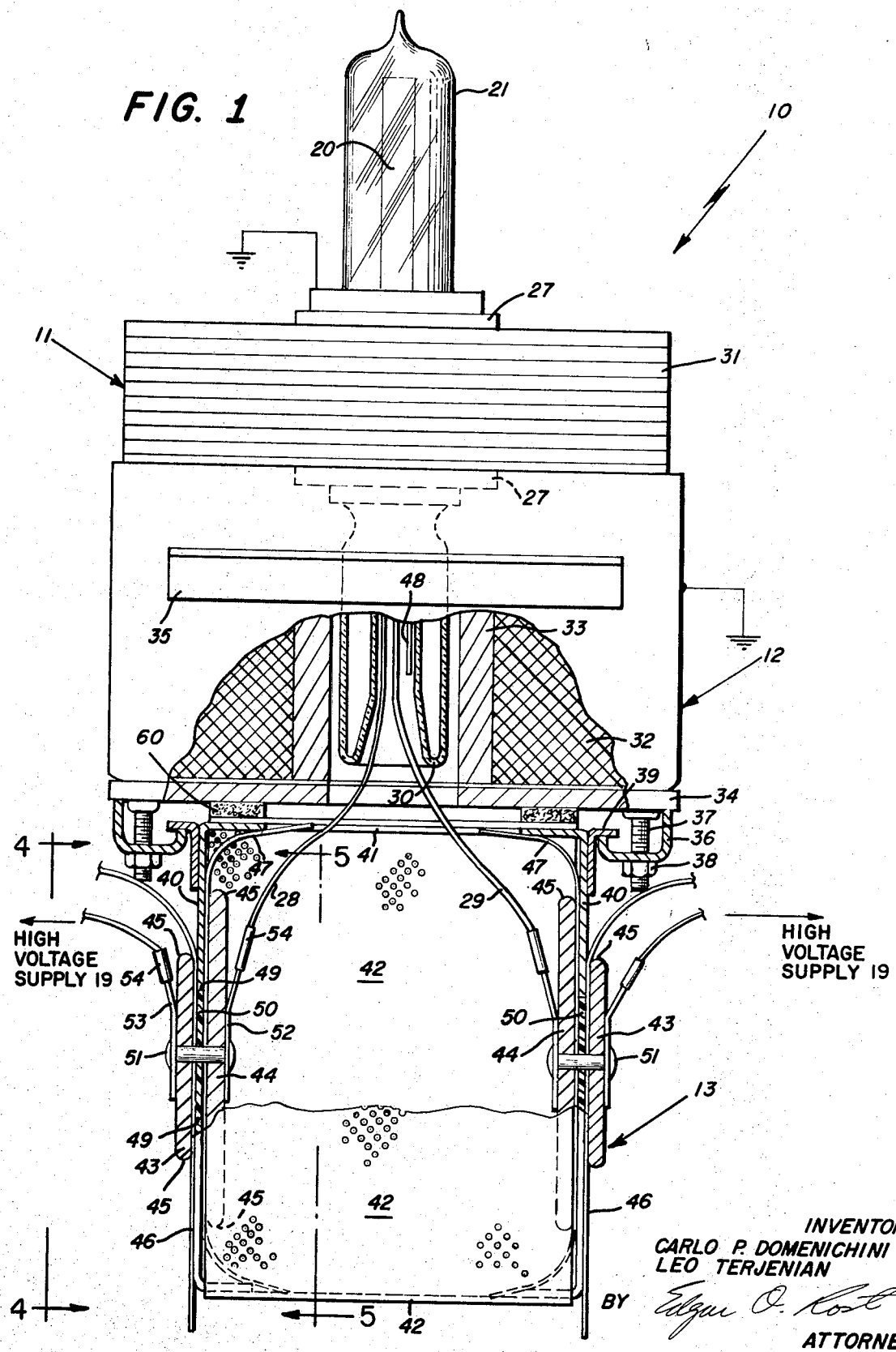
FIG. 1 is a vertical sectional view of the microwave energy generator and filter box assembly embodying the invention, removed from the electronic oven apparatus.
Figure 2:
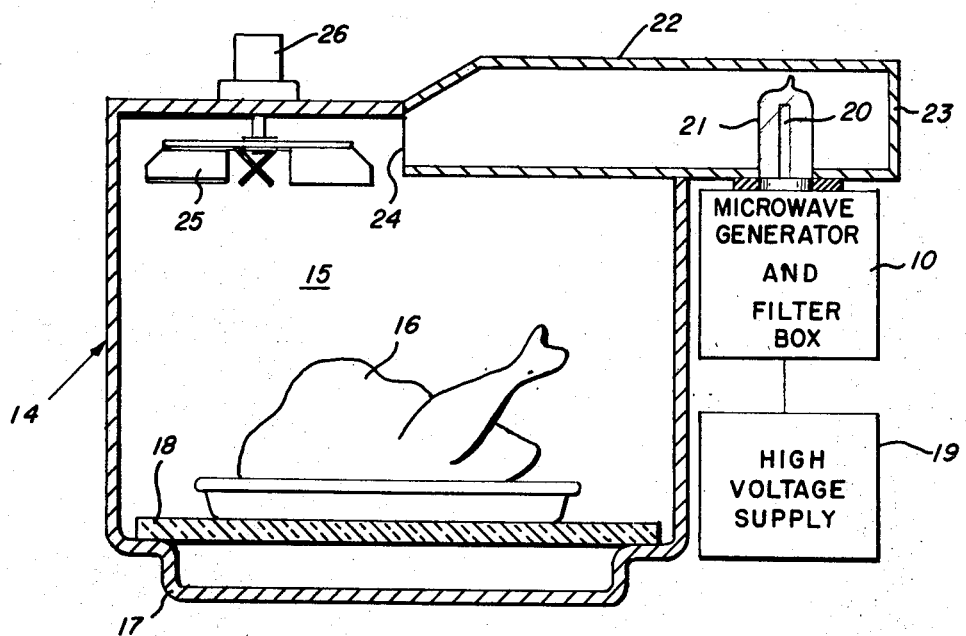
FIG. 2 is a vertical sectional view of an electronic oven apparatus utilizing the embodiment of the invention.

Referring now to the drawings, FIG. 1 is illustrative of a complete power generation assembly for an electronic oven designated generally by the numeral 10. A microwave power generator 11 with accompanying magnetic field producing means 12 has appended thereto an electrically conductive enclosure means 13 defining a capacitive filter arrangement incorporating the preferred embodiment of the invention. Before describing in detail the present invention, it will be of assistance to refer to FIG. 2 illustrative of an electronic oven apparatus.

A hollow rectangular parallelepiped conductive enclosure 14 provides a cavity 15 which serves as the oven for the cooking of any articles of food 16. Access to the interior of the oven is provided by door closure means which are well known in the art and, therefore, need not be described in detail herein. A dimpled wall arrangement 17 defining a sump is disposed in the bottom wall of the oven enclosure to provide for more efficient cooking of the articles of food resting on a dielectric member 18 supported by the shoulders of the wall 17.

The microwave energy generation means and embodiment of the invention 10 is coupled to a conventional high voltage supply circuit 19 including a transformer, D.C. rectifier, control means, capacitor and resistor means together with suitable leads and interconnections. The electromagnetic energy from the generator is fed by means of a radiating probe 20 in dielectric dome member 21 to a section of rectangular waveguide 22 appropriately dimensioned to propagate the energy at the desired frequency into oven cavity 15. The waveguide section is closed at one end by wall 23 and is open at the inner end 24. Upon energizing of the microwave energy generator the electromagnetic waves radiating within the oven cavity are uniformly distributed by a stirrer 25 which is driven by a fan motor 26. The stirrer means are well known in the art and have been described in detail in U.S. Letters Patent 2,813,185, issued Nov. 12, 1957 to Robert V. Smith and assigned to the assignee of the present invention.

In FIG. 1 the microwave energy generator 11 is of the magnetron type which includes within an evacuated envelope 27 of a highly conductive material such as copper an anode defining plural resonant cavities and a centrally disposed cathode with an internal heater, all of well known construction, and explained in detail in the aforementioned text and Letters Patent to Schall et al. An electron interaction region is defined between the cathode and anode with a high electric field normal to the generator axis. The cathode lead 28 and heater lead 29 are disposed within the dielectric cathode electrode support assembly 30 axially disposed at the opposing end of the envelope 27. Cooling fins 31 provide for the direction of a circulated coolant for the rapid removal of the heat generated by the high frequency oscillations.

The magnetron device is completed by magnetic field producing means such as an electromagnet 12 axially disposed adjacent to the device and providing by a large number of turns of conductive wire 32 and core member 33 a magnetic field directed transversely to the tube axis. The electromagnet 12 is coupled to and supports the magnetron device by housing and pole piece members 34 of a conductive metal. The oscillations are generated by the crossed electric and magnetic fields which induce a spoke-like revolving space charge in the interaction region. A bracket member 35 secured to electromagnet 12 may be utilized for mounting of the entire assembly within the oven apparatus.

The embodiment of the invention includes an enclosure 13 of a box-like configuration defining the capacitive filter means surrounding the cathode and heater leads 28 and 29 of the magnetron device and provides means for the connection of these leads to the high voltage supply 19. Other possible configurations include circular, spherical or irregularly shaped structures. The filter box enclosure 13 is fabricated of a lightweight electrically conductive metal such as, for example, aluminum and is secured to the magnetron magnet housing structure by plural fastening means, each including clamp 36, threaded stud 37 and nut 38 engaging bracket 39. The magnetron device 11 and electromagnet assembly 12 are conventionally grounded and the opposing sidewalls 40 of the filter box enclosure are therefore also at ground potential. Access to the interior of the filter box enclosure 13 may be had by opening 41 and a radio frequency gasket 60 of a woven mesh material such as, for example, commercially available Metex, surrounds this opening to prevent radiation and leakage of any microwave energy.

The filter box is enclosed on the remaining three sides by perforated metallic walls 42 to permit circulation of a coolant where desired. The dimensions of the perforations are selected to prevent radiation at the operating frequency of the magnetron. On opposing sides of each ground plate wall member 40 the capacitive filter arrangement is disposed to prevent radiation of any spurious radio frequency energy. An outer and inner capacitive plate member such as discs 43 and 44, respectively, of a metal such as aluminum, having deburred and rounded peripheral walls 45 are conductively coupled to the high voltage feedthrough electrical conductors 51. Any other shaped plate members such as square or elliptical are also encompassed by the invention. Dielectric insulating members 46 and 47 are sandwiched between the capacitive plate members and the ground plate wall members 40. Members 46 and 47 are preferably of a substantially larger dimension than the companion or corresponding capacitive plate members so as to extend beyond intersecting point of the filter box walls 40 and 42. The spacer members prevent electrical breakdown across the surface of the material to ground, commonly referred to as creep voltage breakdown, and are desirably of a material having a minimum dielectric strength of 3000 volts per mil such as, for example, Mylar, a commercially available brand. The dielectric members contact opposing conductive surfaces of the wall members 40 and overlap all possible areas of radio frequency radiation through the intersecting corners of the filter box enclosure of radio frequency energy escaping from the back end of the magnetron through the cathode support 30 and electrical leads 28, 29, as well as getter lead 48.

Figure 3:
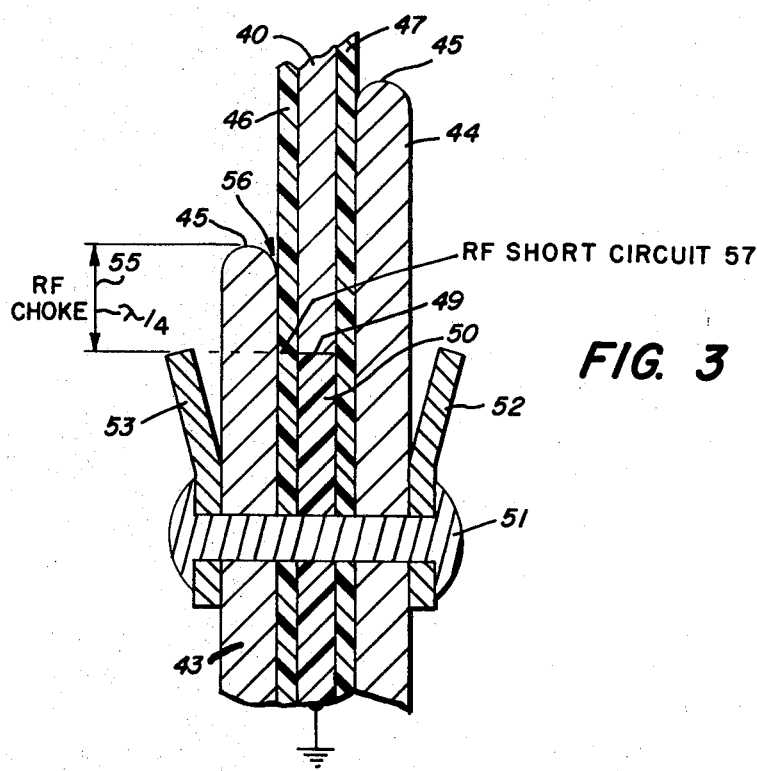
FIG. 3 is an enlarged fragmentary cross-sectional view of the illustrative embodiment of the invention.
Figure 4:
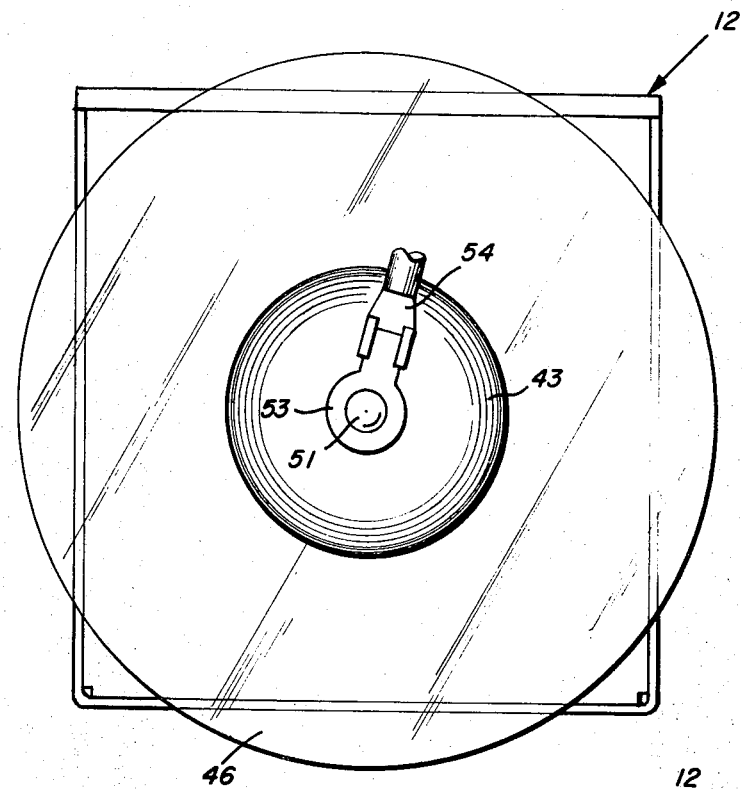
FIG. 4 is a side elevational view along the line 4—4 in FIG. 1 viewed in the direction of the arrows.
Figure 5:
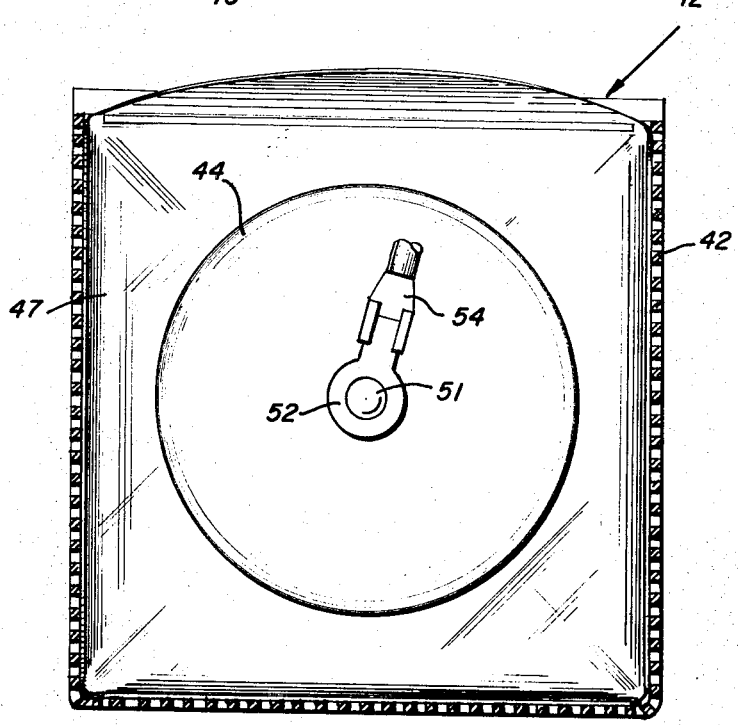
FIG. 5 is a vertical sectional view along the line 5—5 in FIG. 1 viewed in the direction of the arrows.

Referring now to FIGS. 3, 4 and 5, it will be noted that each of the walls 40 has a central aperture 49 completely enclosed by an insulator disc 50 of any suitable material, such as Mylar. High voltage feedthrough conductors 51 comprising a rivet are supported by insulator disc 50 and extend through the capacitive plate members 43 and 44. Terminal lugs 52 and 53 contact the capacitive members 43 and 44 and are retained by the conductors 51 to provide good electrical continuity. Capacitive filter means are therefore provided on opposing sides of the grounded wall members 40 to substantially suppress the radiation of low and high radio frequency energy. The appropriate internal and external electrical connections between the magnetron components and high voltage supply circuit are made to the terminal lugs by electrical leads and connectors 54. Additional lugs may also be provided where desired on either end. All dielectric components including spacers 46, 47 and insulators 50 are coated with an insulating compound, illustratively Dow Corning silicon grease, and riveted together under high pressure to eliminate air pockets to prevent incidence of corona discharge.

In FIG. 4 the overlapping construction of the outer dielectric spacer members 46 is clearly shown with the edges extending beyond the enclosure walls on all four sides. For the sake of clarity the filter box enclosure has been removed from the adjacent electromagnet structure to illustrate the salient features of the invention and the fastening means are not shown. In FIG. 5 the same overlapping feature is illustrated with the surplus edges bent in a direction towards the viewer.

With the dimensions of the capacitive plate member 43 and 44 selected to be similar on both sides the filter box capacitance was measured at a value of approximately 600 picofarads. At this value the radiation level was substantially reduced at the TV and low frequency end of the microwave spectrum. Still further improvement was noted, however, by the provision of structure now to be described. Referring again to FIG. 3, it is noted that the diameter of the outer capacitive plate members 43 relative to inner members 44 is reduced and is selected with relation to the dimensions of central apertures 49 in wall members 40 so as to define a radio frequency choke arrangement. The distance indicated by the arrow 55 is selected to provide a dimension of approximately one-quarter of a wavelength in the dielectric medium at the second harmonic of the magnetron operating frequency or approximately 4800-5000 megacycles. This radio frequency choke arrangement results in an open circuit at point 56 defined between plate member 43 and wall member 40 which effectively reflects a short circuit at the peripheral edges of the aperture 49 indicated by the numeral 57. At the higher microwave frequencies then the leakage path of any energy bypassing the space between the edge of inner capacitive plate members 44 and the wall members 40 to the point of the aperture walls will be substantially completely reflected. Through this arrangement radio frequency interference measurements at the second harmonic frequencies of the normal magnetron operating frequency were measurably improved by a factor of 18 to 20 decibels over prior art structures. The larger internal capacitive plate members 44 then provide for suppression of most of the radiation at the lower frequencies and the combined structure defining the radio frequency choke will successfully prevent the radiation of energy at the higher frequencies.

In an exemplary embodiment utilized with a magnetron generator in an oven apparatus, a capacitive filter box enclosure arrangement in accordance with the teachings of the present invention was measured to be corona free at 4000 to 5000 volts peak AC and no breakdown of the dielectric insulating material was observed at voltages up to 24000 volts DC. Radio frequency interference measurements were well within the Federal Communications Commission regulations at a level of approximately 35 decibals above 1 microvolt measured with a calibrating antenna at 10 feet. The central apertures 49 of the wall members 40 had a dimension of 1.250 inches and the diameter of the outer plate members was approximately 1.910 inches. The increment of approximately .660 inch is divided in half to result in a path dimension of .330 inch which is the approximate one-quarter wavelength dimension at the second harmoic frequency of the megnetron. In the same embodiment the inner capacitive plate members had an overall diameter of approximately 3.187 inches. The disclosed capacitive filter box enclosure has therefore provided an efficient high voltage feedthrough conductor having low loss characteristics and providing for suppression of spurious radiation at TV frequencies and the low and high end of the applicable microwave frequencies.

The structure disclosed may be modified for example by including multiple plate members having dielectric material sandwiched in between to collectively define either the smaller outer member or larger inner member or both. Such a filter would be a multi-stage filter and provide even greater attenuation over a broad bandwidth. Other modifications may be practiced in the configuration of the overall filter box as well as the capacitive plate and dielectric members. It is desired, therefore, that this description be considered as illustrative only without limiting in any way the interpretation of the broadest aspects of the invention as defined in the appended claims.

What is claimed is:
1. An electronic oven apparatus comprising:
means defining a cooking chamber;
an electromagnetic energy generator having external leads for a cathode electrode and cathode heater;
a high voltage supply circuit; and
means for connecting said circuit to said generator leads and suppressing radiated energy from other than said cooking chamber;
said connecting and suppressing means comprising:
an electrically conductive enclosure coupled to said generator and enclosing said leads;
electrical feedthrough conductors extending through and insulated from opposing walls of said enclosure;
capacitive filter means disposed adjacent to opposing ends of said conductors;
said capacitive filter means including inner and outer conductive plate members extending on opposing sides of and parallel to the walls of said enclosure with dielectric means disposed therebetween;
means for electrically connecting the outer end of said feedthrough conductors to said circuit means; and
means for electrically connecting the inner end of said feedthrough conductors to said generator leads.

2. An electronic oven apparatus according to claim 1 wherein said dielectric means are dimensioned to extend beyond the point of intersection of all walls of said enclosure.

3. An electronic oven apparatus comprising:
means defining a cooking chamber;
an electromagnetic energy generator having external electrical leads for a cathode electrode and cathode heater;
a high voltage supply circuit; and
means for connecting said circuit to said generator leads and suppressing radiated energy from other than said cooking chamber;
said connecting and suppressing means comprising:
an electrically conductive enclosure coupled to said generator;
electrical feedthrough conductors extending through and insulated from opposing walls of said enclosure; and
inner and outer conductive plate members extending parallel to the walls of said enclosure disposed adjacent to opposing ends of said conductors with dielectric means disposed therebetween to define a capacitive filter;
said outer conductive plate member defining with the adjacent wall portion of said enclosure and dielectric means a high frequency choke dimensioned to substantially impede escape of electromagnetic energy outside the enclosure.

4. An electronic oven apparatus according to claim 3 wherein said high frequency choke is dimensioned to provide a distance of approximately one-quarter of a wavelength at a harmonic frequency of the electromagnetic energy generator operating frequency.

5. An electronic oven apparatus according to claim 3 wherein said inner conductive plate members have a substantially larger diameter than said outer conductive plate members.

6. An electronic oven apparatus according to claim 3 wherein said outer conductive plate members have a dimension relative to the peripheral edges of said electrical feedthrough conductor insulating means of approximately one-quarter of a wavelength of a harmonic frequency of the electromagnetic energy generator operating frequency.

7. An electronic oven apparatus according to claim 3 wherein the dimensions of said high frequency choke are selected to provide a distance of approximately one-quarter of a wavelength of the second harmonic frequency of the electromagnetic energy generator operating frequency.

References Cited

UNITED STATES PATENTS

| | | | |
|---|---|---|---|
| 3,020,447 | 2/1962 | Schall et al. | 315—85 |
| 3,230,431 | 1/1966 | Deniston | 333—79 X |
| 3,321,605 | 5/1967 | Reker | 219—10.55 |
| 3,377,562 | 4/1968 | Staats | 219—10.55 |

JOSEPH V. TRUHE, Primary Examiner

L. H. BENDER, Assistant Examiner

U.S. Cl. X.R.

219—10.75; 333—79